United States Patent Office.

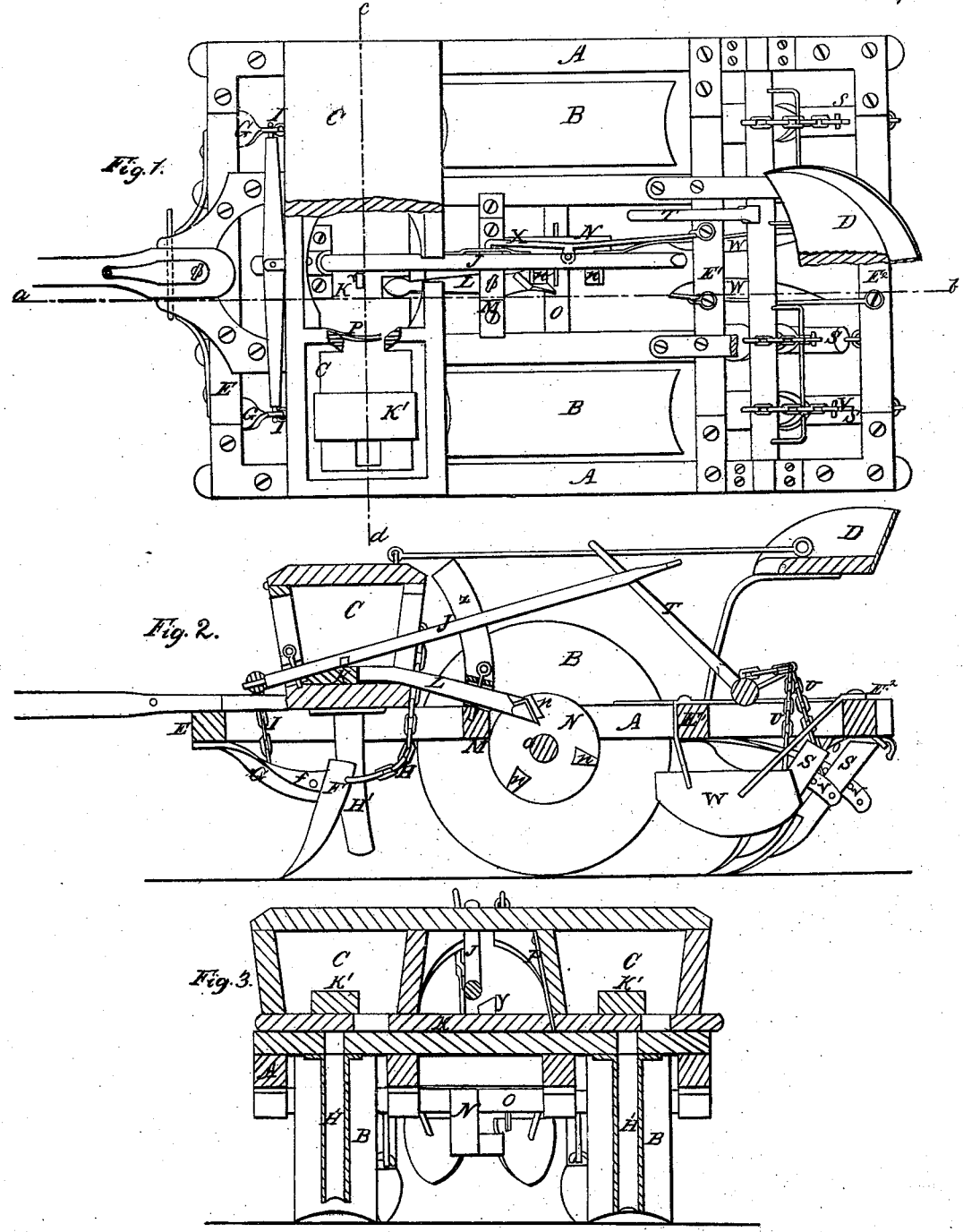

JOHN W. HOLLAMAN, OF MAPLE GROVE, ILLINOIS.

Letters Patent No. 85,826, dated January 12, 1869.

---

IMPROVEMENT IN COMBINED CORN-PLANTER AND CULTIVATOR.

---

The Schedule referred to in these Letters Patent and making part of the same.

---

*To all whom it may concern:*

Be it known that I, JOHN W. HOLLAMAN, of Maple Grove, in the county of Edwards, and State of Illinois, have invented a new and useful Improved Combined Corn-Planter and Cultivator; and I do hereby declare the following to be a full, clear, and exact description thereof, reference being had to the accompanying drawings, which are made a part of this specification, and in which—

Figure 1 is a top view or plan, a part of the seed-box, and lid, and a portion of the seat being removed to expose the working-parts more thoroughly.

Figure 2 is a longitudinal vertical section, on the line *a b*, fig. 1.

Figure 3 is a transverse vertical section, on the line *c d*, fig. 1.

The machine has a double series of operating-devices working consecutively in the order named hereafter, and adapted to plant and cover two rows at once. They consist, on each side of the median line of the machine, of a furrower, seed-dropper, roller, and double-shovel covering-plow.

The offices of the parts are signified by their names. The forward share opens a furrow. The seed is dropped, by automatic devices, into the furrow. The hollow-faced roller closes in the earth upon the seed from each side. The plows at the rear turn in a light furrow upon the seed, making a friable surface, through which the young plants will readily protrude.

The frame A is mounted upon two wheels, B B, which also have functions as rollers.

The frame is adapted to support a pair of seed-boxes, C C, before the wheels, and a driver's seat, D, in the rear of the wheels, the seed-box and seat tending to balance each other.

The frame has three transverse beams, E E¹ E², to which the standards and guide-arms of the shares are connected.

The forward share, F, has a short beam, *f*, in front, by which it is pivoted to the arm G, the latter being firmly bolted to the front beam, E, of the frame.

The rear part of the share is suspended by a chain, H, from a hook in the rear of the seed-box, and the forward end is connected by a chain, I, with a bar, or the front end of the lever J, by which means the vertical adjustment of the furrower-share is secured.

A separate seed-box is provided for each row, but the corn is dropped from each simultaneously, the seed-slide K being continuous, and being moved by the oscillation of the lever L, which is pivoted on the short beam M, and actuated by the contact of the cams *n*, on the wheel N, which is keyed upon the main axle O of the machine.

After each impulse, the slide is returned by the spring P.

The motion of the slide towards the off side of the machine brings the holes in the slide K beneath the bar K' in the hopper, and closes the seed-apertures.

The rollers B B have concave faces, so as to press the soil inward from each side, towards the seed.

The upper ends of the rear plow-standards S are attached, by hooks, to the rear transverse beam E² of the machine.

They are adapted to run on each side of the row, and are vertically adjusted by means of the lever T and chains U, the arms V, which are bolted to the beam E¹, traversing slots in the plow-standards as the plows are adjusted.

Hanging plates W travel on each side of the furrow, and fend off clods from above the seeds.

The levers J and T are brought into convenient relation to the driver's seat, so that he can raise the furrower or covering-plows from the ground, or lower them to their work, as occasion may require.

In turning at the end of the row, or in travelling from the field, the furrowers are raised and the seeder placed out of operation, by depressing the forward lever J, and bringing it in contact with the near side of a block, Y, on the seed-slide, driving the said slide over to the off side of the machine.

A spring-catch, X, then locks the lever J to the standard Z, and preserves the machine in operative condition.

The lever L is thereby held out of contact with the cams on the wheel N.

The operation is as follows:

The hoppers are furnished with seed, and the machine brought into position at the end of the row, ready to begin work.

As the team progresses, the forward share on each side makes a furrow, and at regulated intervals the cams on the wheel N oscillate the lever L, and bring the contents of the pockets in the slide K over the holes in the floors, through which the seed falls down the tubes H', in the rear of the furrowers, and reaches the ground. The rollers follow and close in the soil from each side. The covering-plows throw soil upon the seed-row, the plates W warding off the clods.

On reaching the end of the rows, the levers J and T are depressed by hand and foot, respectively, raising the plows and locking the seed-slide out of operative condition.

The machine is then turned to commence another row, taking care that the point of dropping the first two hills is in correspondence to those of the next row. By this means the seed is planted in check-rows.

I do not claim novelty in the individual parts of my planter, when separately considered.

Having described my invention,

What I claim therein as new, and desire to secure by Letters Patent, is—

1. The arrangement of the double-system of adjustable furrowing and covering-devices, the transversely-reciprocating seed-slide K, oscillating lever L, chains H and V, the levers J and T, the catch X, and standard Z, and centrally-located cam-wheel N, upon the axle O, when constructed and arranged substantially as and for the purposes set forth.

2. The arrangement of the lever J, its catch X, and standard Z, acting in conjunction with the seed-slide K and its stud Y, and with the furrower-plows F, to maintain the furrower and seeding-devices out of operation, when required.

To the above specification of my invention, I have signed my hand, this 4th day of September, 1868.

JOHN W. HOLLAMAN.

Witnesses:
F. D. PRESTON,
O. KNIGHT.